United States Patent
Wang (10) Patent No.: US 12,457,142 B2
(45) Date of Patent: Oct. 28, 2025

(54) METHOD FOR TRANSMITTING SRS AND RELATED PRODUCTS

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 538 days.

(21) Appl. No.: 17/864,784

(22) Filed: Jul. 14, 2022

(65) Prior Publication Data

US 2022/0353124 A1 Nov. 3, 2022

Related U.S. Application Data (63) Continuation of application No. PCT/CN2021/077607, filed on Feb. 24, 2021.

(30) Foreign Application Priority Data

Jan. 14, 2020 (CN) .......................... 202010040823.2

(51) Int. Cl.
| | |
|---|---|
| H04L 27/06 | (2006.01) |
| H04L 27/26 | (2006.01) |
| H04W 72/04 | (2023.01) |
| H04W 72/0453 | (2023.01) |
| H04W 72/23 | (2023.01) |

(52) U.S. Cl.
CPC ...... *H04L 27/2613* (2013.01); *H04L 27/2605* (2013.01); *H04W 72/0453* (2013.01); *H04W 72/23* (2023.01)

(58) Field of Classification Search
CPC ........... H04L 27/2605; H04L 27/2613; H04W 72/0453; H04W 72/23
See application file for complete search history.

(56) References Cited

U.S. PATENT DOCUMENTS

| | | | |
|---|---|---|---|
| 9,019,906 B2 * | 4/2015 | Iwai ................... | H04W 72/542 455/562.1 |
| 10,285,191 B2 | 5/2019 | Hwang et al. | |
| 10,334,573 B2 * | 6/2019 | Nishio ................. | H04L 1/0029 |

(Continued)

FOREIGN PATENT DOCUMENTS

| | | |
|---|---|---|
| CN | 108601084 A | 9/2018 |
| CN | 109474400 A | 3/2019 |

(Continued)

OTHER PUBLICATIONS

Rp-193133, WID proposal FeMIMO, dated Dec. 12, 2019.

(Continued)

*Primary Examiner* — Alpus Hsu
(74) *Attorney, Agent, or Firm* — HAUPTMAN HAM, LLP (57) ABSTRACT

A method for transmitting a sounding reference signal (SRS) and related products are provided. The method includes the following. A terminal device transmits a first SRS to a network device in an SRS region of N sub-bands of an SRS bandwidth. The terminal device receives first downlink control information (DCI).

18 Claims, 7 Drawing Sheets (56) References Cited

U.S. PATENT DOCUMENTS

| | | | |
|---|---|---|---|
| 2019/0037562 A1* | 1/2019 | Park | H04W 72/23 |
| 2019/0052424 A1* | 2/2019 | Manolakos | H04W 72/23 |
| 2019/0109732 A1 | 4/2019 | Choi et al. | |
| 2019/0174466 A1* | 6/2019 | Zhang | H04L 5/0057 |
| 2019/0281588 A1* | 9/2019 | Zhang | H04W 52/08 |
| 2019/0372734 A1* | 12/2019 | Choi | H04B 7/0628 |
| 2020/0036493 A1* | 1/2020 | Choi | H04L 27/262 |
| 2020/0127876 A1* | 4/2020 | Shi | H04L 25/0226 |
| 2020/0177353 A1* | 6/2020 | Ding | H04L 5/001 |
| 2020/0204313 A1* | 6/2020 | Choi | H04L 5/0048 |
| 2020/0220676 A1* | 7/2020 | Xu | H04B 7/06 |
| 2020/0280421 A1* | 9/2020 | Choi | H04L 5/0048 |
| 2020/0412582 A1 | 12/2020 | Manolakos et al. | |

FOREIGN PATENT DOCUMENTS

| | | |
|---|---|---|
| CN | 110267316 A | 9/2019 |
| CN | 110545168 A | 12/2019 |
| JP | 2013528016 A | 7/2013 |
| WO | 2019213914 A1 | 11/2019 |

OTHER PUBLICATIONS

Shao Daojiong, Research and DSP Implementation of Reference Signal Technology in TD-LTE Uplink, dated Dec. 15, 2011.
Samsung, R1-1707995, "DCI Contents for NR".
The first office action issued in corresponding CN application No. 202010040823.2 dated Feb. 8, 2022.
WIPO, International Search Report and Written Opinion for International Application No. PCT/CN2021/077607, Apr. 30, 2021.
Zte et al: "Evolution of NR MIMO in Rel-17", 3GPP Draft; RP-192566, Dec. 2, 2019.
Dahlman Erik et al: "5G NR The Next Generation Wireless Access Technology", Aug. 9, 2018.
The partial supplementary European search report issued in corresponding EP application No. 21740841.8 dated Jan. 30, 2024.
Zte, Sanechips, Discussion on SRS design for NR, 3GPP TSG RAN WG1 Meeting 90bis, R1-1717435, Oct. 3, 2017.
The first office action issued in corresponding JP application No. 2022-543433 dated Oct. 23, 2023.

* cited by examiner

FIG. 14

METHOD FOR TRANSMITTING SRS AND RELATED PRODUCTS

CROSS-REFERENCE TO RELATED APPLICATIONS

This application is a continuation of International Application No. PCT/CN2021/077607, filed on Feb. 24, 2021, the contents of which are incorporated herein by reference in their entirety.

TECHNICAL FIELD

This disclosure relates to the field of communication, and particularly to a method for transmitting a sounding reference signal (SRS) and related products.

BACKGROUND

In 5th generation (5G) communication, communication standard release 17 (Rel-17) plans to introduce a partial-frequency sounding scheme to solve a problem of sounding reference signal (SRS) coverage.

In an existing solution, an SRS bandwidth is divided into at least two sub-bands. This method specifically includes two steps. The first step is that a terminal device transmits an SRS to a network device on a resource block (RB) of each sub-band. The second step is that the network device determines one or more target sub-bands from the at least two sub-bands by evaluating the received SRS in each sub-band, and instructs the terminal device to transmit again an SRS in the target sub-band, so as to implement channel sounding.

However, at present, there is not yet a solution to how the terminal device obtains a position of a target sub-band in an SRS bandwidth and transmits an SRS in the target sub-band.

SUMMARY

In a first aspect, a method for transmitting an SRS is provided in implementations of the disclosure. The method includes the following. A terminal device transmits a first SRS to a network device in an SRS region of N sub-bands of an SRS bandwidth, where N>1, each of the N sub-bands includes one SRS region, and a resource block (RB) quantity in the SRS region is less than or equal to that in a sub-band that the SRS region belongs to.

In a second aspect, a method for transmitting an SRS is provided in implementations of the disclosure. The method includes the following. A terminal device transmits a first SRS to a network device in an SRS region of N sub-bands of an SRS bandwidth, where N>1. An RB configuration quantity in a sub-band of the SRS bandwidth is M. The N sub-bands are a first sub-band and/or a second sub-band, where an RB quantity in the first sub-band is M and an RB quantity in the second sub-band is less than M. Each of the N sub-bands includes one SRS region, and an RB quantity in the SRS region is less than or equal to that in a sub-band that the SRS region belongs to.

In a third aspect, a method for transmitting an SRS is provided in implementations of the disclosure. The method includes the following. A network device receives a first SRS transmitted by a terminal device, where the first SRS is transmitted by the terminal device in an SRS region of N sub-bands of an SRS bandwidth, N>1, each of the N sub-bands includes one SRS region, and an RB quantity in the SRS region is less than or equal to that in a sub-band that the SRS region belongs to.

BRIEF DESCRIPTION OF THE DRAWINGS

In order to describe more clearly technical solutions of implementations of the disclosure or the related art, the following will describe accompanying drawings used for describing the implementations of the disclosure or the related art.

DETAILED DESCRIPTION

Technical solutions of implementations of the disclosure will be described below with reference to the accompanying drawings in implementations of the disclosure.

In order for those skilled in the art to better understand solutions of implementations of the disclosure, the following will describe clearly technical solutions of implementations of the disclosure with reference to the accompanying drawings of implementations of the disclosure. Apparently, implementations described herein are merely some implementations, rather than all implementations, of the disclosure.

The terms "first", "second", "third", and the like used in implementations in the specification, the claims, and the above accompany drawings of the disclosure are used to distinguish similar objects rather than describe a particular order or sequence. In addition, the terms "include", "comprise", and "have" as well as variations thereof are intended to cover non-exclusive inclusion. For example, a process, method, system, product, or device including a series of steps or modules is not limited to the listed steps or modules, and instead, it can optionally include other steps or modules that are not listed, or other steps or modules inherent to the process, method, product, or device can also be included. "And/or" means selecting one or both from the two associated objects.

Implementations of the disclosure provide a method for transmitting a sounding reference signal (SRS) and related products. A terminal device obtains sub-band indication information from first downlink control information (DCI), thereby transmitting an SRS to a network device in a target sub-band indicated by the sub-band indication information.

The terminal device in implementations of the disclosure may refer to a user equipment (UE), an access terminal device, a subscriber unit, a subscriber station, a mobile station, a remote station, a remote terminal device, a mobile device, a user terminal device, a terminal device, a wireless communication device, a user agent, or a user device. The terminal device may also be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5th generation (5G) network, a terminal device in a future evolved public land mobile network (PLMN), etc. Implementations of the disclosure are not limited in this regard.

In addition, in implementations of the disclosure, the terminal device may also be a terminal device in an internet of things (IoT) system. IoT is an important part in future development of information technology. The main technical characteristic of IoT is to connect things to a network through communication technology, so as to realize an intelligent network of human-machine interconnection and interconnection of things.

The network device in implementations of the disclosure may be a device that communicates with the terminal device. The network device may be a base transceiver station (BTS) in a global system of mobile communication (GSM) or in a code division multiple access (CDMA) system, or may be a NodeB (NB) in a wideband code division multiple access (WCDMA) system, or may be an evolutional Node B (eNB or eNodeB) in a long-term evolution (LTE) system, or may be a radio controller in a cloud radio access network (CRAN). Or the network device may be a relay station, an access point, an in-vehicle device, a wearable device, a network device in a 5G network, or a network device in a future evolved PLMN, etc. Implementations of the disclosure are not limited in this regard.

Figure 1:
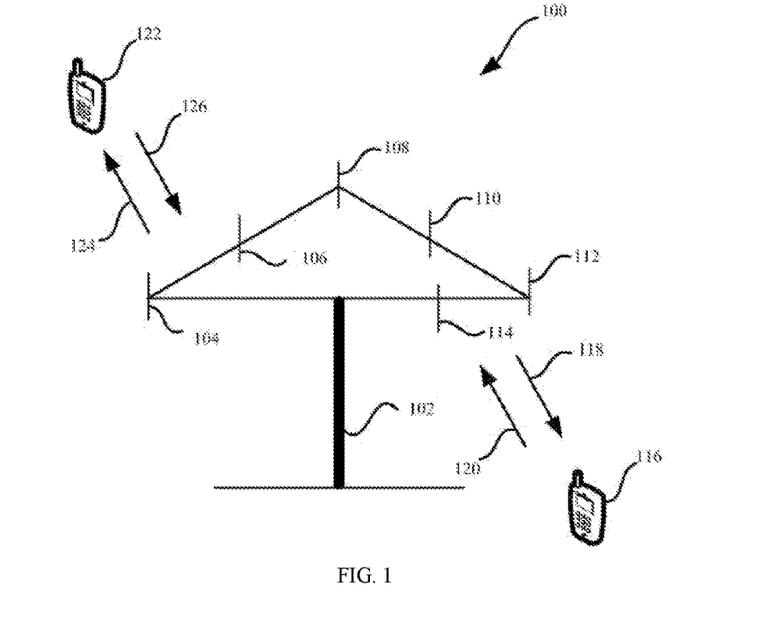
FIG. 1 is a schematic diagram of a network architecture provided in implementations of the disclosure.

FIG. 1 is a schematic architectural diagram of a communication system to which implementations of the disclosure are applicable. The architectural diagram includes a network device 102. The network device 102 may include one antenna or multiple antennas, for example, antennas 104, 106, 108, 110, 112, and 114. In addition, the network device 102 may additionally include a transmitter chain and a receiver chain. Those of ordinary skill in the art can understand that the transmitter chain and the receiver chain each may include multiple components related to signal transmission and reception (such as processor, modulator, multiplexer, demodulator, demultiplexer, or antenna, etc.).

The network device 102 may communicate with multiple terminal devices (such as a terminal device 116 and a terminal device 122). However, it can be appreciated that, the network device 102 may communicate with any quantity of terminal devices like the terminal device 116 or the terminal device 122. The terminal devices 116 and 122 may be, for example, cellular radio telephones, smart phones, laptop computers, handheld communication devices, handheld computing devices, satellite radios, global positioning systems, PDAs, and/or any other suitable device used for communicating over a wireless communication system 100.

As illustrated in FIG. 1, a terminal device 116 communicates with the antennas 112 and 114. The antennas 112 and 114 transmit information to the terminal device 116 through a forward link 118 (also called downlink) and receives information from the terminal device 116 through a reverse link 120 (also called uplink). In addition, the terminal device 122 communicates with the antennas 104 and 106. The antennas 104 and 106 transmit information to the terminal device 122 through the forward link 124 and receive information from the terminal device 122 through the reverse link 126.

In addition, the communication system 100 may be a 5G network or other networks. FIG. 1 is merely a simplified schematic diagram used as an example. A network may also include other network devices (not illustrated in FIG. 1), and the disclosure is not limited in this regard.

Implementations of the disclosure provide a method for transmitting an SRS and related products. The terminal device obtains the sub-band indication information from the first DCI, thereby transmitting an SRS to the network device in the target sub-band indicated by the sub-band indication information.

Figure 2:
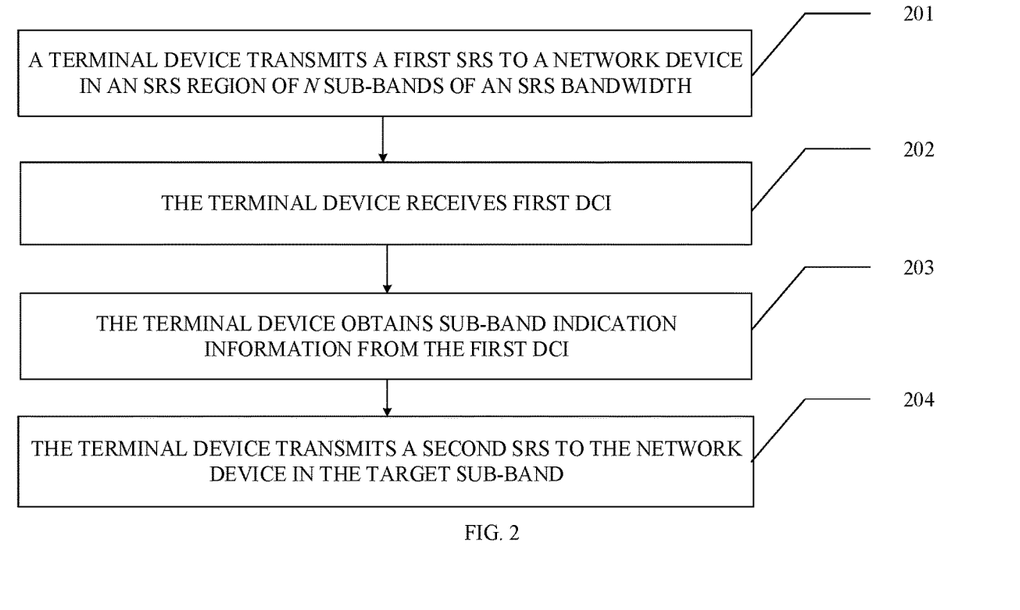
FIG. 2 is a flowchart of a method for transmitting a sounding reference signal (SRS) provided in implementations of the disclosure.

FIG. 2 is a flowchart of a method for transmitting an SRS provided in implementations of the disclosure. As illustrated in FIG. 2, the method is a method for a terminal device to perform SRS transmission. The method includes the following.

201, a terminal device transmits a first SRS to a network device in an SRS region of N sub-bands of an SRS bandwidth.

The SRS bandwidth is an uplink system bandwidth, or a bandwidth part (BWP) of the terminal device (i.e. UE), or a bandwidth allocated to the terminal device by the network device. Each of the N sub-bands of the SRS bandwidth includes one SRS region. A resource block (RB) quantity in the SRS region is less than or equal to that in a sub-band that the SRS region belongs to.

Sub-bands of a bandwidth are frequency bands that are obtained by dividing the bandwidth in frequency domain. In implementations of the disclosure, a sub-band has the following characteristics. A sub-band includes multiple consecutive RBs in frequency domain. Regions of sub-bands of one bandwidth will not overlap. The sizes of sub-bands of one bandwidth are usually the same, where sub-bands with the same size are configuration sub-bands. However, since a bandwidth may not be a multiple of a configuration sub-band, there may exist a sub-band in a bandwidth that is not a configuration sub-band, for example, a first sub-band or a last sub-band of a bandwidth.

Figure 3:
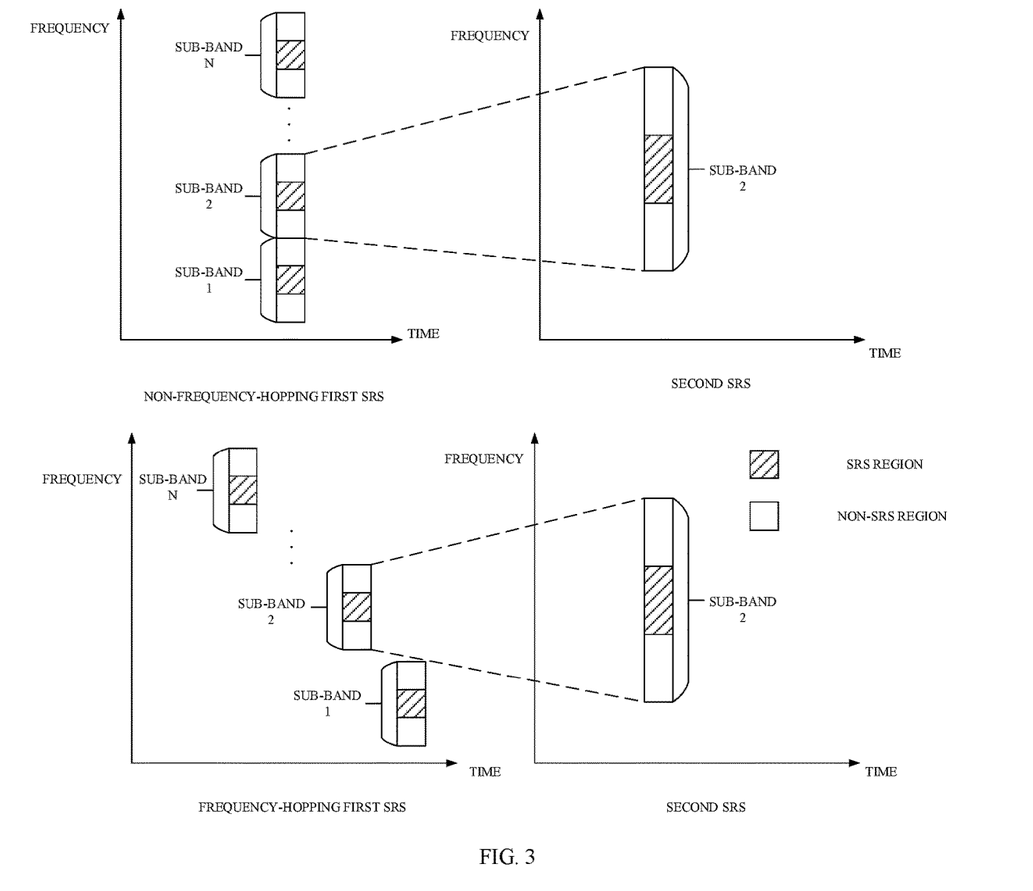
FIG. 3 is a schematic diagram of a first SRS and a second SRS provided in implementations of the disclosure.

As illustrated in FIG. 3, the first SRS may be a frequency-hopping SRS, or may be a non-frequency-hopping SRS. FIG. 3 illustrates a frequency-hopping first SRS and a non-frequency-hopping first SRS. The frequency-hopping first SRS and the non-frequency-hopping first SRS each are transmitted in an SRS region of a sub-band. As illustrated in FIG. 3, an RB quantity in an SRS region is less than that in a sub-band. If a transmit power of the first SRS remains unchanged, by transmitting the first SRS in an SRS region of a sub-band, it is possible to increase a power spectral density (PSD) of the first SRS.

It is to be noted that, in implementations provided in the disclosure, an RB may be a physical resource block (PRB), or a common resource block (CRB), or a virtual resource block (VRB).

Optionally, the method further includes the following.

202, the terminal device receives first DCI.

The terminal device receives the first DCI via a physical downlink control channel (PDCCH). The first DCI indicates that the terminal device transmits a second SRS and indicates an SRS resource used for the terminal device to transmit the second SRS. The first DCI may be common DCI or DCI specific to the terminal device.

203, the terminal device obtains sub-band indication information from the first DCI.

The sub-band indication information indicates a target sub-band among the N sub-bands.

In some implementations, if the first DCI is DCI specific to the terminal device, the sub-band indication information includes a position encoding of the target sub-band in the SRS bandwidth. The position encoding of the target sub-band indicates that the terminal device determines the target sub-band from the N sub-bands. In some other implementations, if the first DCI is common DCI, the sub-band indication information may be one sub-band position information, or may be multiple sub-band position information. The sub-band position information indicates to the terminal device the position encoding of the target sub-band.

204, the terminal device transmits the second SRS to the network device in the target sub-band.

The terminal device may use all RBs in the target sub-band or some RBs in the target sub-band to transmit the second SRS, in order for further sounding of the target sub-band via the second SRS. It is to be noted that, the target sub-band may be one sub-band among the N sub-bands, or may be M sub-bands among the N sub-bands, where $1<M\leq N$.

As illustrated in FIG. 3, the terminal device transmits the second SRS to the network device in one of the N sub-bands. The sub-band used for transmitting the second SRS is the target sub-band. In FIG. 3, the target sub-band is sub-band 2. The terminal device uses all RBs in the target sub-band to transmit the second SRS.

Figure 5:
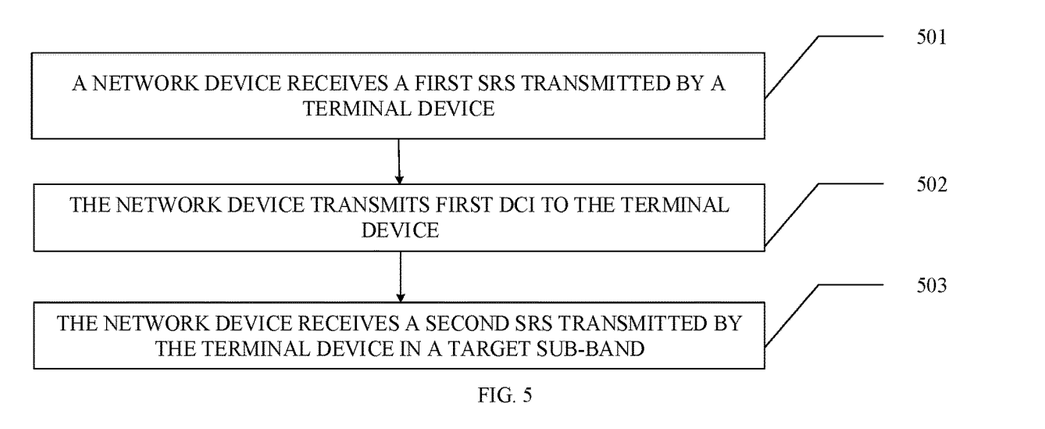
FIG. 5 is a flowchart of another method for transmitting an SRS provided in implementations of the disclosure.

FIG. 5 is a flowchart of a method for transmitting an SRS provided in implementations of the disclosure. As illustrated in FIG. 5, the method is a method for a network device to perform SRS transmission. The method includes the following.

501, a network device receives a first SRS transmitted by a terminal device.

The first SRS is transmitted by the terminal device in an SRS region of N sub-bands of an SRS bandwidth, where $N>1$. Each of the N sub-bands includes one SRS region. An RB quantity in the SRS region is less than or equal to that in a sub-band that the SRS region belongs to.

502, the network device transmits first DCI to the terminal device.

The first DCI includes sub-band indication information. The sub-band indication information indicates a target sub-band used for the terminal device to transmit a second SRS. The first DCI transmitted by the network device may be common DCI, or may be DCI specific to the terminal device.

In some implementations, the terminal device uses all RBs in the target sub-band to transmit the second SRS, to improve accuracy in sounding. In some other implementations, the terminal device uses some RBs in the target sub-band to transmit the second SRS, to increase a PSD of the second SRS.

Optionally, before the network device transmits the first DCI to the terminal device, the network device determines the target sub-band from the N sub-bands according to a receive power of the first SRS. The network device determines the target sub-band from the N sub-bands according to a receive power of the first SRS in each of the N sub-bands. In some implementations, if the target sub-band is one sub-band among the N sub-bands, a receive power of the first SRS for the network device in the target sub-band is a maximum receive power of the first SRS in the N sub-bands. In some other implementations, if the target sub-band is M sub-bands among the N sub-bands, a receive power of the first SRS for the network device in the target sub-band is greater than a power threshold. The power threshold may be adjusted according to actual needs, which is not specifically limited herein.

503, the network device receives the second SRS transmitted by the terminal device in the target sub-band.

The network device receives the second SRS in order for further sounding of the target sub-band via the second SRS, thereby improving accuracy in sounding. The second SRS is an SRS transmitted by the terminal device in the target sub-band.

Figure 6:
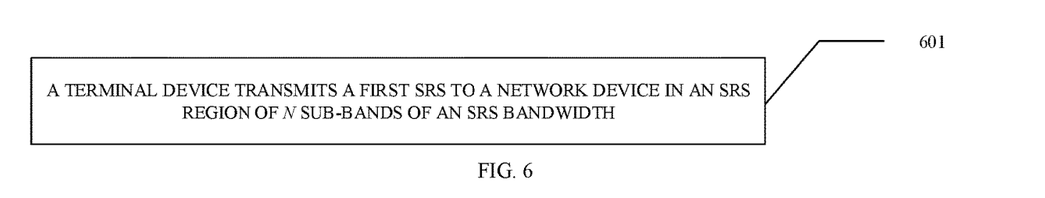
FIG. 6 is a flowchart of another method for transmitting an SRS provided in implementations of the disclosure.

FIG. 6 is a flowchart of a method for transmitting an SRS provided in implementations of the disclosure. As illustrated in FIG. 6, the method is a method for a terminal device to perform SRS transmission. The terminal device transmits an SRS to a network device in an SRS region of N configuration sub-bands having the same size in an SRS bandwidth. However, it is found in practice that since an SRS bandwidth is not a multiple of a configuration sub-band, there exists a sub-band that is not a configuration sub-band. Such a sub-band is a non-configuration sub-band, such as a first sub-band or a last sub-band of an SRS bandwidth.

In the method illustrated in FIG. 6, a scheme of transmitting a first SRS by a terminal device in a first sub-band and/or a second sub-band included in an SRS bandwidth is provided, thereby transmitting the first SRS to a network device. The first sub-band is a configuration sub-band, and the second sub-band is a non-configuration sub-band. As such, a problem of existence of a non-configuration sub-band in an SRS bandwidth can be solved. The method includes the following.

601, a terminal device transmits a first SRS to a network device in an SRS region of N sub-bands of an SRS bandwidth.

It is to be noted that, N is an integer and $N>1$. The N sub-bands are a first sub-band and/or a second sub-band. An RB configuration quantity in a sub-band is M, where $M>0$. A start configuration position of the SRS region in a sub-band is indicated by the network device, for example, indicated via a group of SRS resources triggered by second DCI. The RB configuration quantity in a sub-band may indicated by the network device, or may be a quantity predefined in a communication protocol specification. An RB quantity in the first sub-band is M, and an RB quantity of the second sub-band is less than M. The first sub-band is a configuration sub-band in the SRS bandwidth, and the second sub-band is a non-configuration sub-band in the SRS bandwidth.

Each of the N sub-bands includes one SRS region. The SRS region includes at least one RB. An RB quantity in an SRS region is less than or equal to that in a sub-band that the SRS region belongs to. Each SRS region includes a preset quantity of consecutive RBs in frequency domain. The preset quantity is less than or equal to an RB quantity in a sub-band, and may be adjusted according to actual needs, which is not specifically limited herein. By decreasing a quantity of RBs in a sub-band that are used for transmitting the first SRS, it is conducive to increasing a PSD of the first SRS.

In a possible embodiment, if the N sub-bands include the first sub-band, the terminal device determines a start position of an SRS region of the first sub-band to be the start configuration position. By determining a start position of an SRS region in a sub-band, the terminal device determines the SRS region of the first sub-band. After determining the SRS region of the first sub-band, the terminal device transmits the first SRS to the network device in the SRS region of the first sub-band.

In a possible embodiment, if the N sub-bands include the second sub-band, in some implementations, the terminal device determines not to transmit the first SRS in the second sub-band; in some other implementations, the terminal device takes a first RB position in the second sub-band that is available for SRS transmission as a start position of an SRS region of the second sub-band. By determining a start position of an SRS region of a sub-band, the terminal device determines the SRS region of the sub-band.

Figure 4:
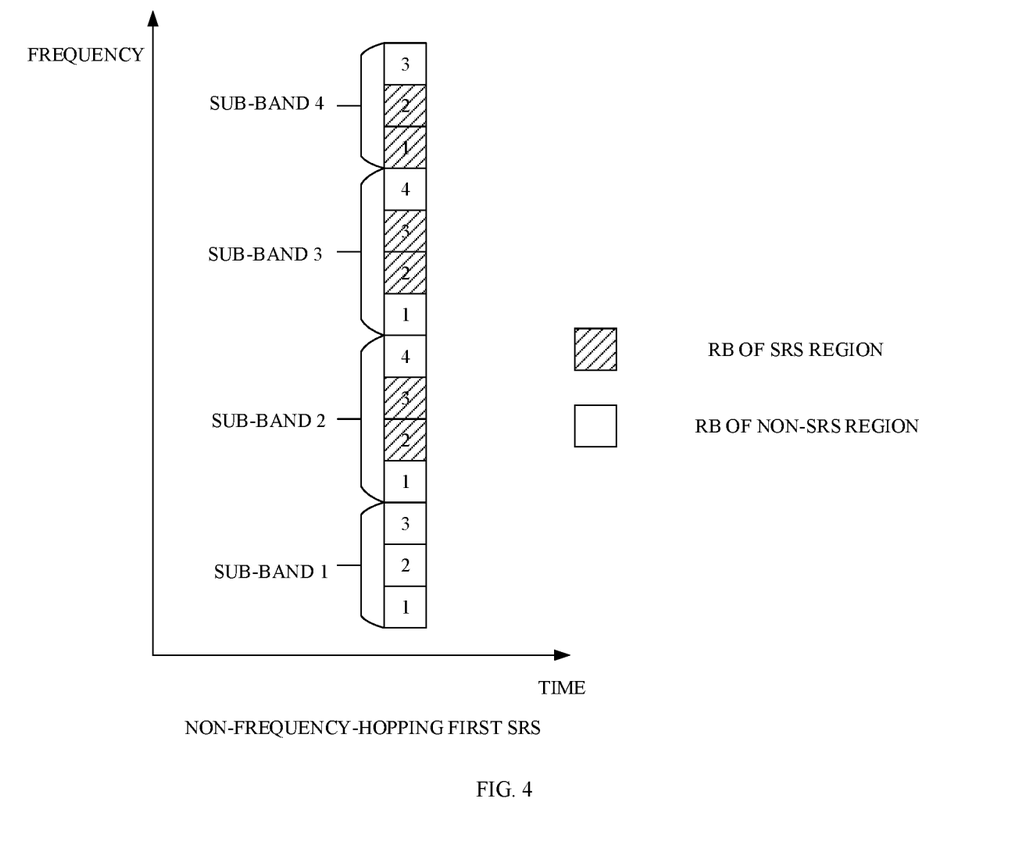
FIG. 4 is a schematic diagram of a first SRS provided in implementations of the disclosure.

In the first SRS illustrated in FIG. 4, the RB configuration quantity in a sub-band is 4. An RB quantity in each of sub-band 2 and sub-band 3 is the RB configuration quantity. The SRS region includes 2 RBs. The start configuration position of the SRS region in a sub-band is 2. The terminal device uses a 2nd RB and a 3rd RB of each of sub-band 2 and sub-band 3 to transmit the first SRS. An RB quantity in each of sub-band 1 and sub-band 4 is less than the RB configuration quantity. The terminal device does not transmit the first SRS in sub-band 1. A start position of an SRS region of sub-band 4 is a first RB position that is available for SRS transmission. A first RB position that is available for SRS transmission in sub-band 4 is 1. Therefore, the SRS region of sub-band 4 is a 1st RB and a 2nd RB, and the terminal device transmits the first SRS on the 1st RB and the 2nd RB of sub-band 4.

Figure 7:
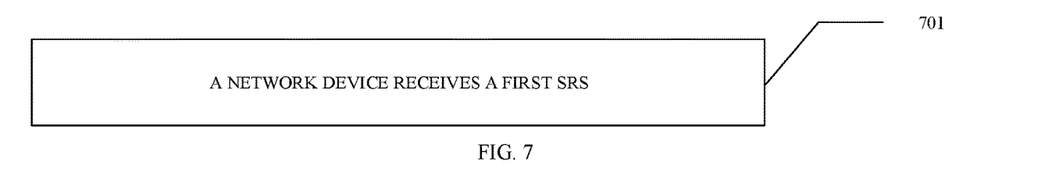
FIG. 7 is a flowchart of another method for transmitting an SRS provided in implementations of the disclosure.

FIG. 7 is a flowchart of a method for transmitting an SRS provided in implementations of the disclosure. As illustrated in FIG. 7, the method is a method for a network device to perform SRS transmission. The method includes the following.

701, a network device receives a first SRS.

The first SRS is transmitted by a terminal device in an SRS region of N sub-bands of an SRS bandwidth, where N>1. The N sub-bands are a first sub-band and/or a second sub-band, where an RB quantity in the first sub-band is M and an RB quantity in the second sub-band is less than M. Each of the N sub-bands includes one SRS region, and an RB quantity in the SRS region is less than or equal to that in a sub-band that the SRS region belongs to.

In an optional implementation, if the N bandwidths include the second sub-band, the first SRS is transmitted by the terminal device in L SRS region(s) of the N sub-bands of the SRS bandwidth, where L≤N. In this implementation, the terminal device does not transmit the first SRS in the second sub-band. Or the terminal device determines a start position of an SRS region of the second sub-band to be a first RB position that is available for SRS transmission in order to determine the SRS region of the second sub-band, and transmits the first SRS in the SRS region of the second sub-band. In case the terminal device transmits the first SRS in the second sub-band among the N sub-bands, L=N. In case the terminal device does not transmit the second SRS in the second sub-band among the N sub-bands, L<N.

Figure 8:
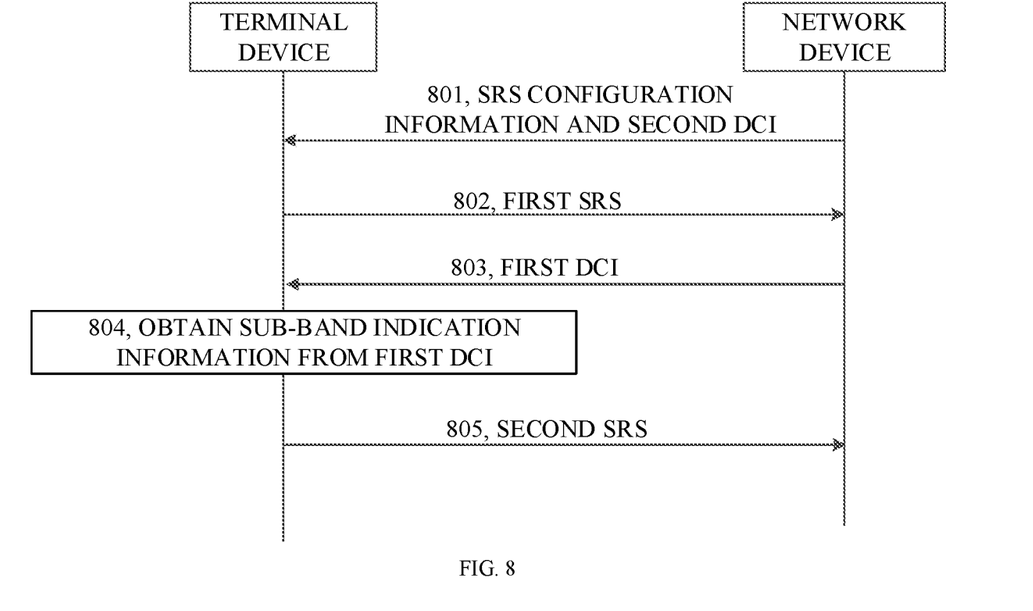
FIG. 8 is a flowchart of another method for transmitting an SRS provided in implementations of the disclosure.

FIG. 8 is a flowchart of a method for transmitting an SRS provided in implementations of the disclosure. As illustrated in FIG. 8, the method illustrates interaction between a network device and a terminal device. FIG. 8 is further refines and completes the methods illustrated in FIG. 2, FIG. 5, FIG. 6, and FIG. 7. The method includes the following.

801, a network device transmits SRS configuration information and second DCI to a terminal device.

It is to be noted that, the network device first transmits the SRS configuration information to the terminal device and then transmits the second DCI to the network device. The second DCI is used for triggering a group of SRS resources in the SRS configuration information. The group of SRS resources triggered by the second DCI is used for the terminal device to transmit a first SRS.

The group of SRS resources include freqDomainPosition and/or freqDomainShift. Optionally, the group of SRS resources further include a cyclic shift parameter, and/or a transmit interlace-related parameter, and/or an orthogonal frequency-division multiplexing (OFDM) symbol parameter, and/or an SRS parameter such as SRS sequence identity (ID). The cyclic shift parameter includes a cyclic-shifted candidate position of an SRS in an RB. Optionally, in implementations of the disclosure, the SRS resource further includes start configuration position information (i.e. local starting PRB index) of an SRS region in a sub-band.

802, the terminal device transmits, on the SRS resource triggered by the second DCI, the first SRS to the network device in an SRS region of N sub-bands of an SRS bandwidth.

The SRS bandwidth is an uplink system bandwidth, or a BWP of the terminal device (i.e. UE), or a bandwidth allocated to the terminal. The N sub-bands of the SRS bandwidth are N frequency bands that are obtained by dividing the SRS bandwidth in frequency domain.

It is to be noted that, N is an integer and N>1. Each of the N sub-bands includes one SRS region. The SRS region includes at least one RB. An RB quantity in an SRS region is less than or equal to that in a sub-band that the SRS region belongs to. Each SRS region includes a preset quantity of consecutive RBs in frequency domain. The preset quantity is less than or equal to an RB quantity in a sub-band, and may be adjusted according to actual needs, which is not specifically limited herein. By decreasing a quantity of RBs in a sub-band that are used for transmitting the first SRS, it is conducive to increasing a PSD of the first SRS.

In an optional embodiment, an RB configuration quantity in a sub-band of the SRS bandwidth is M, where M>0. The N sub-bands of the SRS bandwidth include a first sub-band and a second sub-band. In case an RB quantity in the first sub-band is M, the terminal device determines a start position of an SRS region of the first sub-band to be a start configuration position. In case an RB quantity in the second sub-band is less than M, in some implementations, the terminal device determines not to transmit the first SRS in the second sub-band; in some other implementations, the terminal device takes a first RB position in the second sub-band that is available for SRS transmission as a start position of an SRS region of the second sub-band. By determining a start position of an SRS region in a sub-band, the terminal device determines the SRS region of the sub-band. In an existing stepwise SRS transmission scheme, if an RB quantity in a sub-band is less than an RB configuration quantity in the sub-band, the sub-band is a non-configuration sub-band, for example, a first sub-band or a last sub-band of the SRS bandwidth is a non-configuration sub-band. How the terminal device transmits an SRS in a non-configuration sub-band has not yet been proposed. In this embodiment, a problem of how the terminal device transmits an SRS in a non-configuration sub-band is solved in two manners.

803, the network device transmits first DCI to the terminal device.

The first DCI includes sub-band indication information, where the sub-band indication information indicates that the terminal device transmits a second SRS in a target sub-band. Optionally, the first DCI further indicates an SRS resource used for the terminal device to transmit a second SRS.

In an optional implementation, the SRS resource used for the terminal device to transmit the second SRS is information of an SRS resource used for the terminal device transmit the first SRS, and includes a cyclic shift parameter, and/or a transmit interlace-related parameter, and/or an OFDM symbol parameter, and/or an SRS parameter such as SRS sequence ID and optionally further includes freqDomainPosition and/or freqDomainShift. After the first DCI is received by the terminal, the terminal obtains the SRS resource triggered by the second DCI.

Optionally, before transmitting the first DCI, the network device determines the target sub-band from the N sub-bands according to a receive power of the first SRS. The network device determines the target sub-band from the N sub-bands according to a receive power of the first SRS in each of the N sub-bands. In some implementations, if the target sub-band is one sub-band among the N sub-bands, a receive power of the first SRS for the network device in the target sub-band is a maximum receive power of the first SRS in the N sub-bands. In some other implementations, if the target sub-band is M sub-bands among the N sub-bands, a receive power of the first SRS for the network device in the target sub-band is greater than a power threshold. The power threshold may be adjusted according to actual needs, which is not specifically limited herein.

804, the terminal device obtains sub-band indication information from the first DCI.

The sub-band indication information indicates the target sub-band among the N sub-bands. If the first DCI is DCI specific to the terminal device, the sub-band indication information includes a position encoding of the target sub-band in the SRS bandwidth. The position encoding of the target sub-band indicates that the terminal device determines the target sub-band from the N sub-bands.

If the first DCI is common DCI, the sub-band indication information may be one sub-band position information, or may be multiple sub-band position information. Each sub-band position information includes at least one position encoding. If the sub-band indication information includes multiple sub-band position information, a format of the sub-band indication information is [position/sub-band position information 0, position/sub-band position information 1, . . . , position/sub-band position information N]. One target sub-band position information included in the multiple sub-band position information is sub-band position information for the terminal device. The terminal device determines target sub-band information from the multiple sub-band position information according to position indication information, where the position indication information indicates a position of the target sub-band position information in the sub-band indication information. If the sub-band indication information includes one sub-band position information, a format of the sub-band indication information is [position/sub-band position information], where the sub-band position information indicates the position encoding of the target sub-band.

If the first DCI is common DCI and the sub-band indication information includes one sub-band position information, the sub-band position information indicates the position encoding(s) of the target sub-band(s) for multiple terminal devices. The terminal device determines the position encoding of the target sub-band for the terminal device according to the sub-band position information and the SRS resource triggered by the second DCI. In some implementations, if N is less than or equal to the RB configuration quantity M in a sub-band, the position encoding of the target sub-band is a result of a modulo operation on a sum of a position encoding in the sub-band position information and the start configuration position with N. In some other implementations, if N>M, the position encoding of the target sub-band is a result of a modulo operation on a sum of a position encoding in the sub-band position information, the start configuration position, and a first modulo result with N, where the first modulo result is obtained through a modulo operation on the candidate position and a difference between N and M.

If the first DCI is common DCI, and the sub-band indication information includes at least two sub-band position information and the at least two sub-band position information includes target sub-band position information, the terminal device obtains the target sub-band position information from the sub-band indication information according to position indication information, and takes a position encoding in the target sub-band position information as the position encoding of the target sub-band. The position indication information is indicated by the network device. In some implementations, the position indication information is contained in the SRS configuration information. In some other implementations, the position indication information is contained in other configuration information. Before the network device transmits the first DCI to the terminal device, the network device transmits the position indication information to the terminal device.

805, the terminal device transmits the second SRS to the network device in the target sub-band.

Optionally, the terminal device transmits the second SRS to the network device in the target sub-band on the SRS resource triggered by the second DCI. Specifically, the terminal device obtains a cyclic shift parameter, and/or a transmit interlace-related parameter, and/or an OFDM symbol parameter, and/or an SRS parameter such as SRS sequence ID and optionally freqDomainPosition and/or freqDomainShift. The terminal device transmits the second SRS to the network device according to the SRS parameter obtained. The terminal device may use all RBs in the target sub-band or use some RBs in the target sub-band to transmit the second SRS, in order for further sounding of the target sub-band via the second SRS.

In implementations of the disclosure, the terminal device obtains the sub-band indication information from the first DCI, thereby transmitting an SRS to the network device in the target sub-band indicated by the sub-band indication information.

Figure 9:
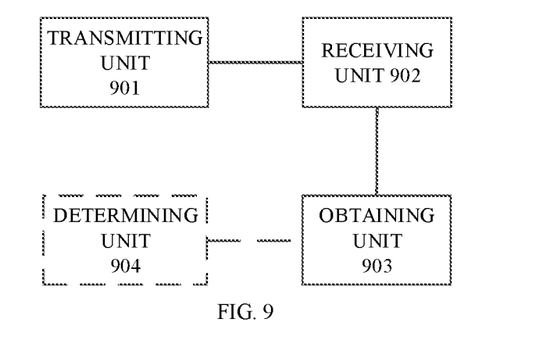
FIG. 9 is a schematic structural diagram of a terminal device provided in implementations of the disclosure.

FIG. 9 illustrates a terminal device provided in implementations of the disclosure. As illustrated in FIG. 9, the terminal device includes a transmitting unit 901, a receiving unit 902, and an obtaining unit 903. The transmitting unit 901 is configured to transmit a first SRS to a network device in an SRS region of N sub-bands of an SRS bandwidth, where N>1, each of the N sub-bands includes one SRS region, and an RB quantity in the SRS region is less than or equal to that in a sub-band that the SRS region belongs to. The receiving unit 902 is configured to receive first DCI. The obtaining unit 903 is configured to obtain sub-band indication information from the first DCI, where the sub-band indication information indicates a target sub-band among the N sub-bands. The transmitting unit 901 is further configured to transmit a second SRS to the network device in the target sub-band.

In an optional implementation, the receiving unit 902 is further configured to receive SRS configuration information and second DCI, where the second DCI is used for triggering a group of SRS resources in the SRS configuration information and indicates that the terminal device transmits the first SRS on the SRS resource.

In an optional implementation, the transmitting unit 901 is specifically configured to transmit the second SRS to the network device in the target sub-band on the SRS resource triggered by the second DCI.

In an optional implementation, the terminal device further includes a determining unit 904. The determining unit 904 is configured to determine a position encoding of the target sub-band in the SRS bandwidth according to the sub-band indication information and the SRS resource, where the position encoding of the target sub-band indicates the target sub-band among the N sub-bands.

In an optional implementation, the sub-band indication information includes one sub-band position information, the SRS resource includes a start configuration position of the SRS region in a sub-band, and the determining unit 904 is specifically configured to perform a modulo operation on a sum of a position encoding in the sub-band position information and the start configuration position with N, to obtain a position of the target sub-band.

In an optional implementation, the sub-band indication information includes one sub-band position information, the SRS resource further includes a cyclic-shifted candidate position, an RB configuration quantity in a sub-band of the SRS bandwidth is M, and the determining unit 904 is specifically configured to perform a modulo operation on the candidate position and a difference between N and M to obtain a first modulo result, and perform a modulo operation on a sum of a position encoding in the sub-band position information, the start configuration position, and the first modulo result with N to obtain the position encoding of the target sub-band.

In an optional implementation, the sub-band indication information includes at least two sub-band position information, the receiving unit 902 is further configured to receive position indication information, where the position indication information indicates target sub-band position information among the at least two sub-band position information. A position encoding in the target sub-band position information is a position encoding of the target sub-band in the SRS bandwidth, where the position encoding of the target sub-band indicates the target sub-band among the N sub-bands.

In an optional implementation, an RB configuration quantity in a sub-band of the SRS bandwidth is M, and the SRS resource includes a start configuration position of the SRS region in a sub-band. The transmitting unit 901 is specifically configured to determine a start position of an SRS region of a first sub-band among the N sub-bands to be the start configuration position if an RB quantity in the first sub-band is M, where the first sub-band is any one of the N sub-bands. The transmitting unit 901 is further configured to transmit the first SRS to the network device in the SRS region of the first sub-band.

In an optional implementation, an RB configuration quantity in a sub-band of the SRS bandwidth is M. If an RB quantity in a second sub-band among the N sub-bands is less than M, the transmitting unit 901 is specifically configured to determine not to transmit the first SRS in the second sub-band, or determine a start position of an SRS region of the second sub-band to be a first RB position in the second sub-band that is available for SRS transmission and transmit the first SRS to the network device in the SRS region of the second sub-band, where the second sub-band is any one of the N sub-bands.

Figure 10:
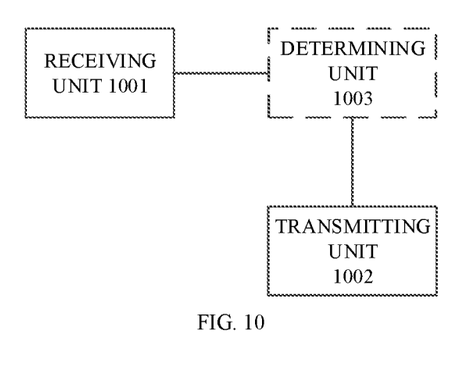
FIG. 10 is a schematic structural diagram of a network device provided in implementations of the disclosure.

FIG. 10 illustrates a network device provided in implementations of the disclosure. As illustrated in FIG. 10, the network device includes a receiving unit 1001 and a transmitting unit 1002. The receiving unit 1001 is configured to receive a first SRS transmitted by a terminal device, where the first SRS is transmitted by the terminal device in an SRS region of N sub-bands of an SRS bandwidth, N>1, each of the N sub-bands includes one SRS region, and an RB quantity in the SRS region is less than or equal to that in a sub-band that the SRS region belongs to. The transmitting unit 1002 is configured to transmit first DCI to the terminal device, where the first DCI includes sub-band indication information, and the sub-band indication information indicates a target sub-band used for the terminal device to transmit a second SRS. The receiving unit 1001 is further configured to receive the second SRS transmitted by the terminal device in the target sub-band.

In an optional implementation, the transmitting unit 1002 is further configured to transmit SRS configuration information and second DCI to the terminal device, where the second DCI is used for triggering a group of SRS resources in the SRS configuration information and indicates that the terminal device transmits the first SRS on the SRS resource.

In an optional implementation, the first DCI further indicates that the terminal device transmits the second SRS to the network device on the SRS resource triggered by the second DCI.

In an optional implementation, the sub-band indication information includes one sub-band position information, and the SRS resource includes a start configuration position of the SRS region in a sub-band. A position encoding of the target sub-band is a result of a modulo operation on a sum of a position encoding in the sub-band position information and the start configuration position with N. The position encoding of the target sub-band indicates the target sub-band among the N sub-bands.

In an optional implementation, the sub-band indication information includes one sub-band position information, the SRS resource includes a start configuration position and a cyclic-shifted candidate position of the SRS region in a sub-band, and an RB configuration quantity in a sub-band of the SRS bandwidth is M. A position encoding of the target sub-band is a result of a modulo operation on a sum of a position encoding in the sub-band position information, the start configuration position, and a first modulo result with N, where the first modulo result is obtained through a modulo operation on the candidate position and a difference between N and M.

In an optional implementation, the sub-band indication information includes at least two sub-band position information. The transmitting unit 1002 is further configured to transmit position indication information to the terminal device, where the position indication information indicates target sub-band position information among the at least two sub-band position information. A position encoding in the target sub-band position information is a position encoding of the target sub-band, where the position encoding of the target sub-band indicates the target sub-band among the N sub-bands.

In an optional implementation, the network device further includes a determining unit 1003. The determining unit 1003 is configured to determine the target sub-band from the N sub-bands according to a receive power of the first SRS.

Figure 11:
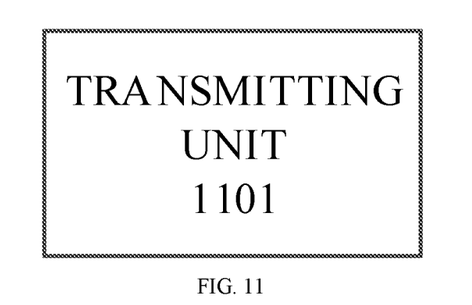
FIG. 11 is a schematic structural diagram of another terminal device provided in implementations of the disclosure.

FIG. 11 illustrates a terminal device provided in implementations of the disclosure. As illustrated in FIG. 11, the terminal device includes a transmitting unit 1101. The transmitting unit 1101 is configured to transmit a first SRS to a network device in an SRS region of N sub-bands of an SRS bandwidth, where N≥1. An RB configuration quantity in a sub-band of the SRS bandwidth is M. The N sub-bands are a first sub-band and/or a second sub-band, where an RB quantity in the first sub-band is M and an RB quantity in the second sub-band is less than M. Each of the N sub-bands includes one SRS region, and an RB quantity in the SRS region is less than or equal to that in a sub-band that the SRS region belongs to.

In an optional implementation, the transmitting unit 1101 is specifically configured to determine a start position of an SRS region of the first sub-band to be a start configuration position if the N sub-bands include the first sub-band, and transmit the first SRS to the network device in the SRS region of the first sub-band among the N sub-bands.

In an optional implementation, if the N sub-bands include the second sub-band, the transmitting unit 1101 is specifically configured to determine not to transmit the first SRS in the second sub-band, or determine a start position of an SRS region of the second sub-band to be a first RB position in the second sub-band that is available for SRS transmission and transmit the first SRS to the network device in the SRS region of the second sub-band among the N sub-bands.

Figure 12:
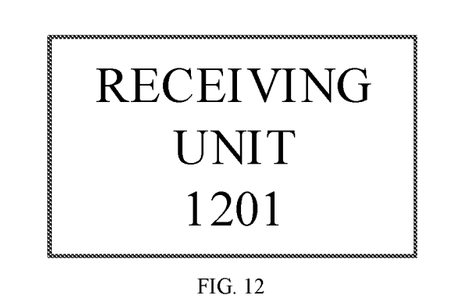
FIG. 12 is a schematic structural diagram of another network device provided in implementations of the disclosure.

FIG. 12 illustrates a network device provided in implementations of the disclosure. As illustrated in FIG. 12, the network device includes a receiving unit 1201. The receiving unit 1201 is configured to receive a first SRS, where the first SRS is transmitted by a terminal device in an SRS region of N sub-bands of an SRS bandwidth, and N≥1. The N sub-bands are a first sub-band and/or a second sub-band, where an RB quantity in the first sub-band is M and an RB quantity in the second sub-band is less than M. Each of the N sub-bands includes one SRS region, and an RB quantity in the SRS region is less than or equal to that in a sub-band that the SRS region belongs to.

It should be understood that, the division of various modules of the terminal device and the network device above is only a division of logical functions, and all or some of these modules may be integrated into one physical entity or may be physically separated in practice. For example, each of the above modules may be a separate processing component, or may be integrated into the same chip for implementation. In addition, they can also be stored in a storage component of a controller in the form of program codes, and functions of the above modules are invoked and executed by a processing component of a processor. Furthermore, the various modules may be integrated together or may be separately implemented. The processing component herein may be an integrated circuit chip with signal processing capabilities. During implementation process, each step of the foregoing methods or each of the above modules may be completed by an integrated logic circuit in the form of hardware or an instruction in the form of software of a processing element. The processing element can be a general-purpose processor such as a central processing unit (CPU), or can be one or more integrated circuits configured to implement the foregoing methods such as one or more application-specific integrated circuits (ASIC), or one or more microprocessors (such as digital signal processors (DSP)), or one or more field-programmable gate arrays (FPGA), etc.

Figure 13:
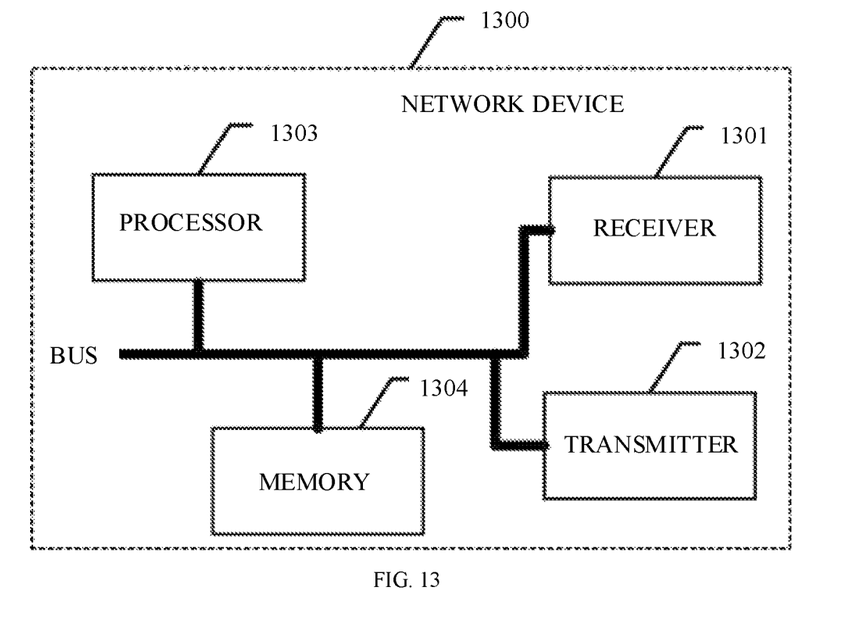
FIG. 13 is a schematic structural diagram of another network device provided in implementations of the disclosure.

The following will describe another network device provided in implementations of the disclosure. Refer to FIG. 13, the network device 1300 includes a receiver 1301, a transmitter 1302, a processor 1303, and a memory 1304 (where the quantity of the processor 1303 of the network device 1300 may be one or multiple, and FIG. 13 takes one processor as an example). In some implementations of the disclosure, the receiver 1301, the transmitter 1302, the processor 1303, and the memory 1304 may be coupled together via a bus or in other manners. FIG. 13 takes connection via a bus as an example.

The memory 1304 may include a read-only memory (ROM) and a random-access memory (RAM), and provides instructions and data to the processor 1303. A part of the memory 1304 may also include a non-volatile RAM (NVRAM). The memory 1304 stores an operating system and operation instructions, executable modules or data structures, or their subsets, or their extended sets. The operation instructions may include various operation instructions for implementing various operations. The operating system may include various system applications for implementing various basic services and handling hardware-based tasks.

The processor 1303 controls operations of the network device. The processor 1303 may also be referred to as a CPU. In practice, various components of the network device are coupled together via a bus system. In addition to a data bus, the bus system may include a power bus, a control bus, a status signal bus, and the like. However, for the sake of clarity, various buses in FIG. 13 are referred to as a bus system.

The methods disclosed in the foregoing implementations of the disclosure may be applied to the processor 1303, or may be implemented by the processor 1303. The processor 1303 may be an integrated circuit chip with signal processing capabilities. During implementation, each step of the foregoing methods may be completed by an integrated logic circuit in the form of hardware or an instruction in the form of software in the processor 1303. The processor 1303 above may be a general-purpose processor, a DSP, an ASIC, an FPGA, or other programmable logic devices, discrete gates or transistor logic devices, or discrete hardware components, which can implement or execute the methods, steps, and logic blocks disclosed in implementations of the disclosure. The general purpose processor may be a microprocessor, or the processor may be any conventional processor or the like. The steps of the method disclosed in implementations of the disclosure may be implemented directly by a hardware decoding processor, or may be performed by hardware and software modules in the decoding processor. The software module can be located in a storage medium such as a RAM, a flash memory, a ROM, a programmable ROM (PROM), or an electrically erasable programmable memory, registers, and the like. The storage medium is located in the memory 1304. The processor 1303 reads information in the memory 1304, and completes the steps of the method described above with the hardware of the processor 1303.

The receiver 1301 can be configured to receive input numerical or character information, and generate signal input related to network device settings and function control. The transmitter 1302 can include a display device such as display screen. The transmitter 1302 can be configured to output numerical or character information through an external interface.

In implementations of the disclosure, the processor 1303 is configured to execute the foregoing method for transmitting an SRS performed at a network-device side.

Figure 14:
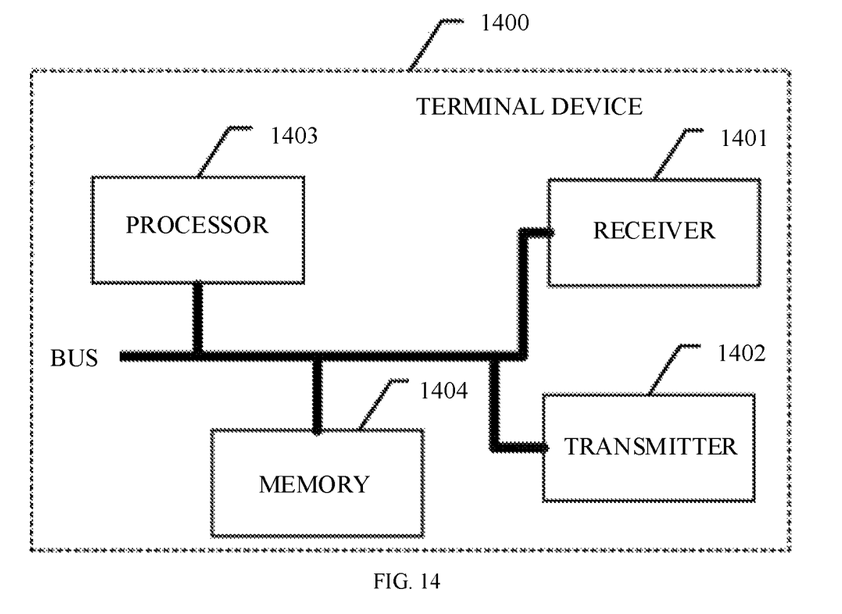
FIG. 14 is a schematic structural diagram of another terminal device provided in implementations of the disclosure.

The following will describe another terminal device provided in implementations of the disclosure. Refer to FIG. 14, the terminal device 1400 includes a receiver 1401, a transmitter 1402, a processor 1403, and a memory 1404 (where the quantity of the processor 1403 of the terminal device 1400 may be one or multiple, and FIG. 14 takes one processor as an example). In some implementations of the disclosure, the receiver 1401, the transmitter 1402, the processor 1403, and the memory 1404 may be coupled together via a bus or in other manners. FIG. 14 takes connection via a bus as an example.

The memory 1404 may include a ROM and a RAM, and provides instructions and data to the processor 1403. A part of the memory 1404 may also include an NVRAM. The memory 1404 stores an operating system and operation instructions, executable modules or data structures, or their subsets, or their extended sets. The operation instructions may include various operation instructions for implementing various operations. The operating system may include various system applications for implementing various basic services and handling hardware-based tasks.

The processor 1403 controls operations of the terminal device. The processor 1403 may also be referred to as a CPU. In practice, various components of the terminal device are coupled together via a bus system. In addition to a data bus, the bus system may include a power bus, a control bus, a status signal bus, and the like. However, for the sake of clarity, various buses in FIG. 14 are referred to as a bus system.

The methods disclosed in the foregoing implementations of the disclosure may be applied to the processor 1403, or may be implemented by the processor 1403. The processor 1403 may be an integrated circuit chip with signal processing capabilities. During implementation, each step of the foregoing methods may be completed by an integrated logic circuit in the form of hardware or an instruction in the form of software in the processor 1403. The processor 1403 above may be a general-purpose processor, a DSP, an ASIC, an FPGA, or other programmable logic devices, discrete gates or transistor logic devices, or discrete hardware components, which can implement or execute the methods, steps, and logic blocks disclosed in implementations of the disclosure. The general purpose processor may be a microprocessor, or the processor may be any conventional processor or the like. The steps of the method disclosed in implementations of the disclosure may be implemented directly by a hardware decoding processor, or may be performed by hardware and software modules in the decoding processor. The software module can be located in a storage medium such as a RAM, a flash memory, a ROM, a PROM, or an electrically erasable programmable memory, registers, and the like. The storage medium is located in the memory 1404. The processor 1403 reads information in the memory 1404, and completes the steps of the method described above with the hardware of the processor 1403.

In implementations of the disclosure, the processor 1403 is configured to execute the foregoing method for transmitting an SRS performed at a terminal-device side.

Implementations of the disclosure provide a computer-readable storage medium. The computer storage medium stores one or more instructions which, when executed by a processor, are operable with the processor to perform the method for transmitting an SRS of implementations of the disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for transmitting a sounding reference signal (SRS), the method comprising:
   transmitting, by a terminal device, a first SRS to a network device in an SRS region of N sub-bands of an SRS bandwidth, wherein N is an integer and greater than 1, each of the N sub-bands comprising one SRS region, and a resource block (RB) quantity in the SRS region being less than or equal to the RB quantity in a sub-band that the SRS region belongs to,
   wherein
   an RB configuration quantity in a sub-band of the SRS bandwidth is M, M being an integer and greater than 0,
   a SRS resource comprises a start configuration position of the SRS region in a sub-band, and
   transmitting, by the terminal device, the first SRS to the network device in the SRS region of the N sub-bands of the SRS bandwidth comprises:
      determining, by the terminal device, a start position of an SRS region of a first sub-band among the N sub-bands to be the start configuration position, in response to an RB quantity in the first sub-band being M, wherein the first sub-band is any one of the N sub-bands; and
      transmitting, by the terminal device, the first SRS to the network device in the SRS region of the first sub-band.

2. The method of claim 1, wherein prior to transmitting, by the terminal device, the first SRS to the network device in the SRS region of the N sub-bands of the SRS bandwidth, the method further comprises:
   receiving, by the terminal device, SRS configuration information and second downlink control information (DCI), wherein the second DCI is used for triggering a group of SRS resources indicated in the SRS configuration information and indicating that the terminal device transmits the first SRS on the SRS resource.

3. The method of claim 2, wherein subsequent to transmitting, by the terminal device, the first SRS, the method further comprises:
   receiving, by the terminal device, first DCI;
   obtaining, by the terminal device, sub-band indication information from the first DCI, the sub-band indication information indicating a target sub-band among the N sub-bands; and
   transmitting, by the terminal device, a second SRS to the network device in the target sub-band.

4. The method of claim 3, wherein transmitting, by the terminal device, the second SRS to the network device in the target sub-band comprises:
   transmitting, by the terminal device, the second SRS to the network device in the target sub-band on the SRS resource triggered by the second DCI.

5. The method of claim 4, wherein subsequent to obtaining, by the terminal device, the sub-band indication information from the first DCI and prior to transmitting, by the terminal device, the second SRS to the network device in the target sub-band, the method further comprises:
   determining, by the terminal device, a position encoding of the target sub-band in the SRS bandwidth according to the sub-band indication information and the SRS resource, wherein the position encoding of the target sub-band indicates the target sub-band among the N sub-bands.

6. The method of claim 5, wherein the sub-band indication information comprises one sub-band position information, the SRS resource comprises a start configuration position of the SRS region in a sub-band, and determining, by the terminal device, the position encoding of the target sub-band in the SRS bandwidth according to the sub-band indication information and the SRS resource comprises:

performing, by the terminal device, a modulo operation on a sum of a position encoding in the sub-band position information and the start configuration position with N, to obtain a position of the target sub-band.

7. The method of claim 5, wherein the sub-band indication information comprises one sub-band position information, the SRS resource comprises a start configuration position and a cyclic-shifted candidate position of the SRS region in a sub-band, an RB configuration quantity in a sub-band of the SRS bandwidth is M, and determining, by the terminal device, the position encoding of the target sub-band in the SRS bandwidth according to the sub-band indication information and the SRS resource comprises:

performing, by the terminal device, a modulo operation on the candidate position and a difference between N and M, to obtain a first modulo result; and performing, by the terminal device, a modulo operation on a sum of a position encoding in the sub-band position information, the start configuration position, and the first modulo result with N, to obtain the position encoding of the target sub-band.

8. The method of claim 3, wherein the sub-band indication information comprises at least two sub-band position information, and prior to receiving, by the terminal device, the first DCI, the method further comprises:

receiving, by the terminal device, position indication information, wherein the position indication information indicates target sub-band position information among the at least two sub-band position information; and a position encoding in the target sub-band position information is a position encoding of the target sub-band in the SRS bandwidth, wherein the position encoding of the target sub-band indicates the target sub-band among the N sub-bands.

9. A method for transmitting a sounding reference signal (SRS), the method comprising:

transmitting, by a terminal device, a first SRS to a network device in an SRS region of N sub-bands of an SRS bandwidth, wherein N is an integer and greater than 1;

a resource block (RB) configuration quantity in a sub-band of the SRS bandwidth being M, M being an integer and greater than 0;

the N sub-bands being at least one of a first sub-band and a second sub-band, an RB quantity in the first sub-band being M, and an RB quantity in the second sub-band being less than M;

each of the N sub-bands comprising one SRS region, and an RB quantity in the SRS region being less than or equal to the RB quantity in a sub-band that the SRS region belongs to.

10. The method of claim 9, wherein a start configuration position of the SRS region in a sub-band is indicated by the network device, and transmitting, by the terminal device, the first SRS to the network device in the SRS region of the N sub-bands of the SRS bandwidth comprises:

determining, by the terminal device, a start position of an SRS region of the first sub-band to be the start configuration position, in response to the N sub-bands comprising the first sub-band; and transmitting, by the terminal device, the first SRS to the network device in the SRS region of the first sub-band among the N sub-bands.

11. The method of claim 9, wherein transmitting, by the terminal device, the first SRS to the network device in the SRS region of the N sub-bands of the SRS bandwidth comprises:

in response to the N sub-bands comprising the second sub-band, determining, by the terminal device, not to transmit the first SRS in the second sub-band; or determining, by the terminal device, a start position of an SRS region of the second sub-band to be a first RB position in the second sub-band that is available for SRS transmission, and transmitting the first SRS to the network device in the SRS region of the second sub-band among the N sub-bands.

12. A method for transmitting a sounding reference signal (SRS), the method comprising:

receiving, by a network device, a first SRS transmitted by a terminal device, the first SRS being transmitted by the terminal device in an SRS region of N sub-bands of an SRS bandwidth, wherein N is an integer and greater than 1, each of the N sub-bands comprising one SRS region, and a resource block (RB) quantity in the SRS region being less than or equal to the RB quantity in a sub-band that the SRS region belongs to;

wherein an RB configuration quantity in a sub-band of the SRS bandwidth is M, M being an integer and greater than 0, a SRS resource, for transmitting the first SRS, comprises a start configuration position of the SRS region in a sub-band, a start position of an SRS region of a first sub-band among the N sub-bands is determined as the start configuration position by the terminal device, and the first SRS received by the network device is transmitted in the SRS region of the first sub-band.

13. The method of claim 12, wherein prior to receiving, by the network device, the first SRS transmitted by the terminal device, the method further comprises:

transmitting, by the network device, SRS configuration information and second downlink control information (DCI) to the terminal device, wherein the second DCI is used for triggering a group of SRS resources indicated in the SRS configuration information and indicating that the terminal device transmits the first SRS on the SRS resource.

14. The method of claim 13, wherein subsequent to receiving, by the network device, the first SRS, the method further comprises:

transmitting, by the network device, first DCI to the terminal device, the first DCI comprising sub-band indication information, and the sub-band indication information indicating a target sub-band used for the terminal device to transmit a second SRS; and receiving, by the network device, the second SRS transmitted by the terminal device in the target sub-band.

15. The method of claim 14, wherein the first DCI further indicates that the terminal device transmits the second SRS to the network device on the SRS resource triggered by the second DCI.

16. The method of claim 14, wherein the sub-band indication information comprises one sub-band position information, and the SRS resource comprises a start configuration position of the SRS region in a sub-band;
- a position encoding of the target sub-band is a result of a modulo operation on a sum of a position encoding in the sub-band position information and the start configuration position with N; and
- the position encoding of the target sub-band indicates the target sub-band among the N sub-bands.

17. The method of claim 14, wherein the sub-band indication information comprises one sub-band position information, the SRS resource comprises a start configuration position and a cyclic-shifted candidate position of the SRS region in a sub-band, and an RB configuration quantity in a sub-band of the SRS bandwidth is M;
- a position encoding of the target sub-band is a result of a modulo operation on a sum of a position encoding in the sub-band position information, the start configuration position, and a first modulo result with N, wherein the first modulo result is obtained through a modulo operation on the candidate position and a difference between N and M.

18. The method of claim 14, wherein the sub-band indication information comprises at least two sub-band position information, and prior to transmitting, by the network device, the first DCI to the terminal device, the method further comprises:
- transmitting, by the network device, position indication information to the terminal device, wherein the position indication information indicates target sub-band position information among the at least two sub-band position information;
- a position encoding in the target sub-band position information is a position encoding of the target sub-band, wherein the position encoding of the target sub-band indicates the target sub-band among the N sub-bands.

* * * * *